Aug. 17, 1965  H. A. SIMPSON  3,201,644
DEVICE FOR AUTOMATICALLY TURNING ON LIGHTS
OF AUTOMOTIVE VEHICLES
Filed Oct. 17, 1961
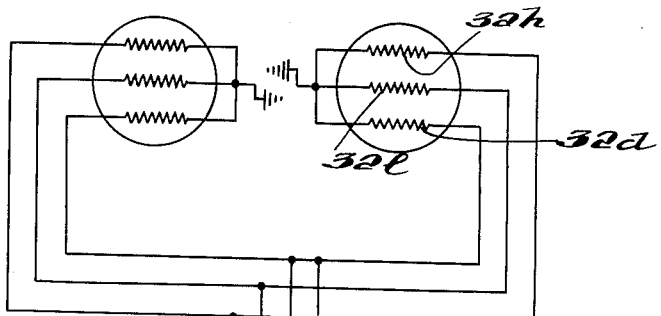
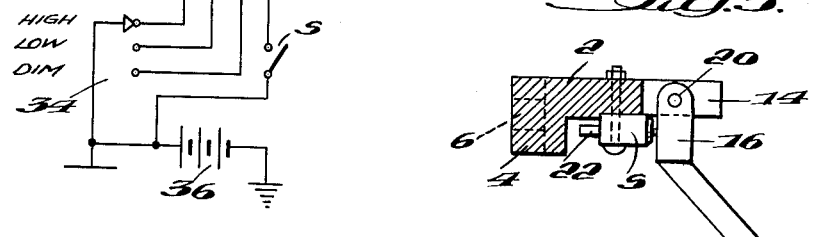
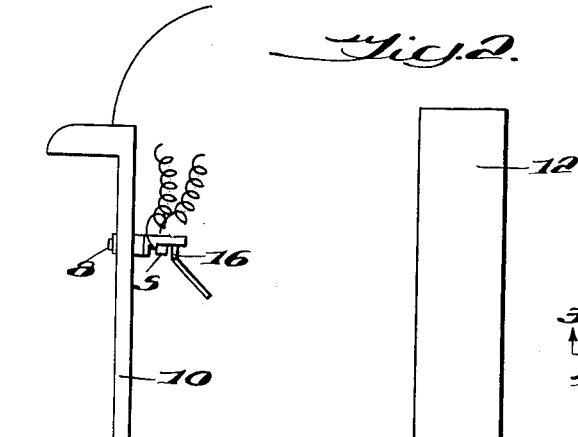
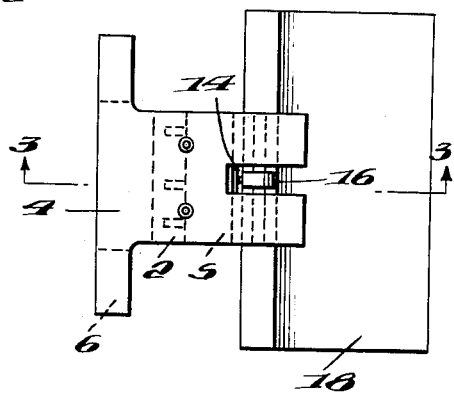
INVENTOR
HENRY A. SIMPSON,
BY
ATTORNEYS

United States Patent Office 3,201,644
Patented Aug. 17, 1965

3,201,644
DEVICE FOR AUTOMATICALLY TURNING ON LIGHTS OF AUTOMOTIVE VEHICLES
Henry A. Simpson, Geneva, Fla.
Filed Oct. 17, 1961, Ser. No. 145,715
5 Claims. (Cl. 315—83)

The invention relates to a safety device for automotive vehicles and more particularly to a system for illuminating the dim filaments of the headlights when the vehicle is moving, regardless of the position of the manual control switch for the lights.

The many head-on collisions of vehicles on the roads today are due to mainly the drivers' inability to see another car approaching in the opposite direction, caused by the blending of the colors of the road with the color of the vehicle and the landscape and light.

It has been proven that a vehicle moving with its headlights burning or shining is more easily seen or approaching. This fact is proven by many of the bus companies insisting that the drivers of these buses keep their headlights lighted while moving. Also, traffic officials are asking people to drive with their headlights on when in heavy traffic over holidays and weekends.

The objectionable feature to this driving with headlights on during the day is that the headlights are not easily discernible to the driver during the day and the driver may forget to switch off the lights when not driving or when he switches off the ignition to the engine. This means that, without the engine operating the generator, the batteries run down and do not have power to start the engine again until replaced or recharged by auxiliary means. This means expense and loss of time to the vehicle owner.

It is the purpose of the present invention to eliminate the hazard of forgetfulness, thus save time and money, by causing or having the lights switch on and off automatically; on, while the car is in motion; off, when the car slows down to a predetermined speed or stops, thereby saving any drain on the power from the battery, when none or not enough current is being supplied by the engine, and causing it to run down. This automation of the headlights will not interfere with the normal manual operation of the headlights for night or dark day driving.

It is a well known fact that any object moving through the air creates a pressure of air against the object's point of contact with the air. The present invention makes use of this air pressure, such as created by a vehicle moving along a road, to have this air pressure motivate an electrical switch to connect the dim filament of the headlights so as to receive power from the batteries or other auxiliary electric power sources when the vehicle is in motion and cut off the power source when the vehicle is stopped or moving at some low preset speed, so as to save the driver of the vehicle from having to think and perform this operation manually.

More particularly, the invention contemplates a very simple switch construction located back of the front grille and thus exposed to the air flowing through it which is actuated by the air to turn on the dim filaments.

Further objects and advantages of the invention will appear more fully from the following description, especially when taken in conjunction with the accompanying drawings which form a part thereof.

In the drawings:

FIG. 1 shows the electrical circuit of the invention;

FIG. 2 shows the switch and its preferred location;

FIG. 3 is a sectional view of the switch on the line 3—3 of FIG. 4; and

FIG. 4 is a top plan view thereof.

The switch arrangement includes a body block 2 having at one end a cross-piece 4 with notches 6. Bolts 8 engaged in these notches and passing through openings in the grille 10 hold the switch on the back of the grille between it and the radiator 12.

The block 2 has a slot 14 in the end remote from cross-piece 4, and an arm 16 of the switch-operating plate 18 engages in the slot. The plate 18 is pivoted to the block 2 by pivot pin 20. The plate extends at an angle backward and downward from the pivot. Secured on the lower side of block 2 is a microswitch S, normally closed by the action of its spring when its actuating pin 22 is moved to the right (FIG. 3).

However, the weight of plate 18 is sufficient to hold the switch S open, by engagement of arm 16 with switch pin, until the vehicle speed exceeds a certain value, whereupon the plate 18 will swing upwards and backwards under the air pressure on it produced by the forward movement of the vehicle, thus allowing switch S to close.

Referring to FIG. 1, the vehicle has headlights 30 with filaments 32h, 32l and 32d for high and low beam and for dim respectively. These can be selectively connected by manual switch 34 to battery 36 to energize one or the other of the filaments. Switch S is connected in shunt with switch 34, so that the dim filaments will always be energized when the switch S is closed, that is, whenever the speed of the vehicle is great enough, whatever may be the position of switch 34.

Thus, even in the daytime, the dim lights will show the presence of the vehicle to drivers coming in the opposite direction, yet when the vehicle slows down or stops the switch S will be opened so as not to drain the battery.

While I have described herein one embodiment of my invention, I wish it be be understood that I do not intend to limit myself thereby except within the scope of the claims hereto or hereinafter appended.

I claim:

1. In a vehicle having headlights with bright and dim filaments, a source of electricity, and manually operable switch means to connect said bright and dim filaments selectively to said source, a connection from said dim filament to said source in parallel with said switch means, and a vehicle responsive switch in said connection for automatically energizing said dim filament when the vehicle speed exceeds a predetermined value.

2. In a vehicle having headlights with bright and dim filaments, a source of electricity, and manually operable switch means to connect said bright and dim filaments selectively to said source, a connection from said dim filament to said source in parallel with said switch means, and an air pressure responsive switch in said connection carried by the vehicle adjacent the front end thereof and exposed to the air into which the vehicle is moving for automatically energizing said dim filament when the vehicle speed exceeds a predetermined value.

3. In a vehicle having headlights with bright and dim filaments, a source of electricity, and manually operable switch means to connect said bright and dim filaments selectively to said source, a connection from said dim filament to said source in parallel with said switch means, and an air pressure responsive switch in said connection including a normally closed switch and a pivoted member having a part engageable with the switch and a gravity actuated portion normally holding said part in engagement with the switch and holding the switch open when the vehicle is at rest, said portion being exposed to the air into which the vehicle is moving and actuable thereby against the action of gravity to move said part away from the switch so as to permit closing thereof for automatically energizing said dim filament when the vehicle speed exceeds a predetermined value.

4. In a vehicle having headlights with bright and dim filaments, a source of electricity, and manually operable switch means to connect said bright and dim filaments selectively to said source, a connection from said dim filament to said source in parallel with said switch means, and an air pressure responsive switch in said connection including a normally closed switch and a pivoted vane having a part engageable with the switch and a gravity actuated portion sloping downwardly and rearwardly for normally holding the switch open when the vehicle is at rest, said portion being exposed to the air into which the vehicle is moving and actuable thereby against the action of gravity to move said part away from the switch so as to permit closing thereof for automatically energizing said dim filament when the vehicle speed exceeds a predetermined value.

5. In a vehicle having a radiator and a grill and having headlights with bright and dim filaments, a source of electricity, and manually operable switch means to connect said bright and dim filament selectively to said source, a connection from said dim filament to said source in parallel with said switch means, an air pressure responsive switch in said connection including a normally closed switch and a vane pivoted on the grill on the rear side thereof having a part engageable with the switch and a gravity acutated portion sloping downwardly and rearwardly for normally holding the switch open when the vehicle is at rest, said portion being exposed to the air into which the vehicle is moving and actuable thereby against the action of gravity to move said part away from the switch so as to permit closing thereof for automatically energizing said dim filament when the vehicle speed exceeds a predetermined value.

References Cited by the Examiner

UNITED STATES PATENTS

| | | | |
|---|---|---|---|
| 1,241,284 | 9/17 | Rhoades | 315—79 |
| 1,951,495 | 3/34 | Trafton | 315—79 |
| 2,910,621 | 10/59 | Paule | 315—82 |
| 3,021,449 | 2/62 | Kerr et al. | 315—83 X |

HERMAN KARL SAALBACH, *Primary Examiner.*

ARTHUR GAUSS, GEORGE N. WESTBY, *Examiners.*